B. S. WOOD.
LATHE ATTACHMENT.
APPLICATION FILED JUNE 24, 1911.
1,052,116.
Patented Feb. 4, 1913.
2 SHEETS—SHEET 1.
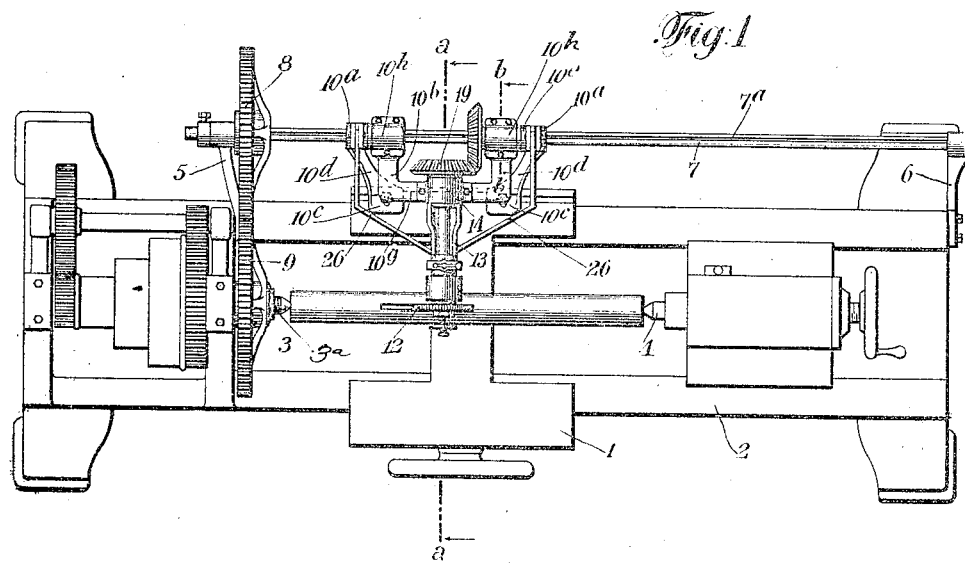
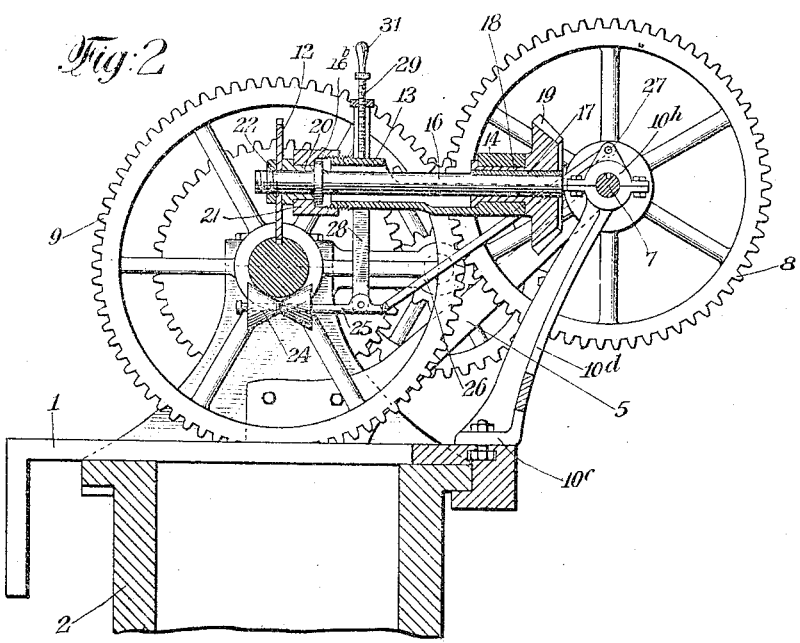
Witnesses:
M. R. Manning
L. E. Morrison
Inventor
B. S. Wood
By his Attorney
P. T. Dodge

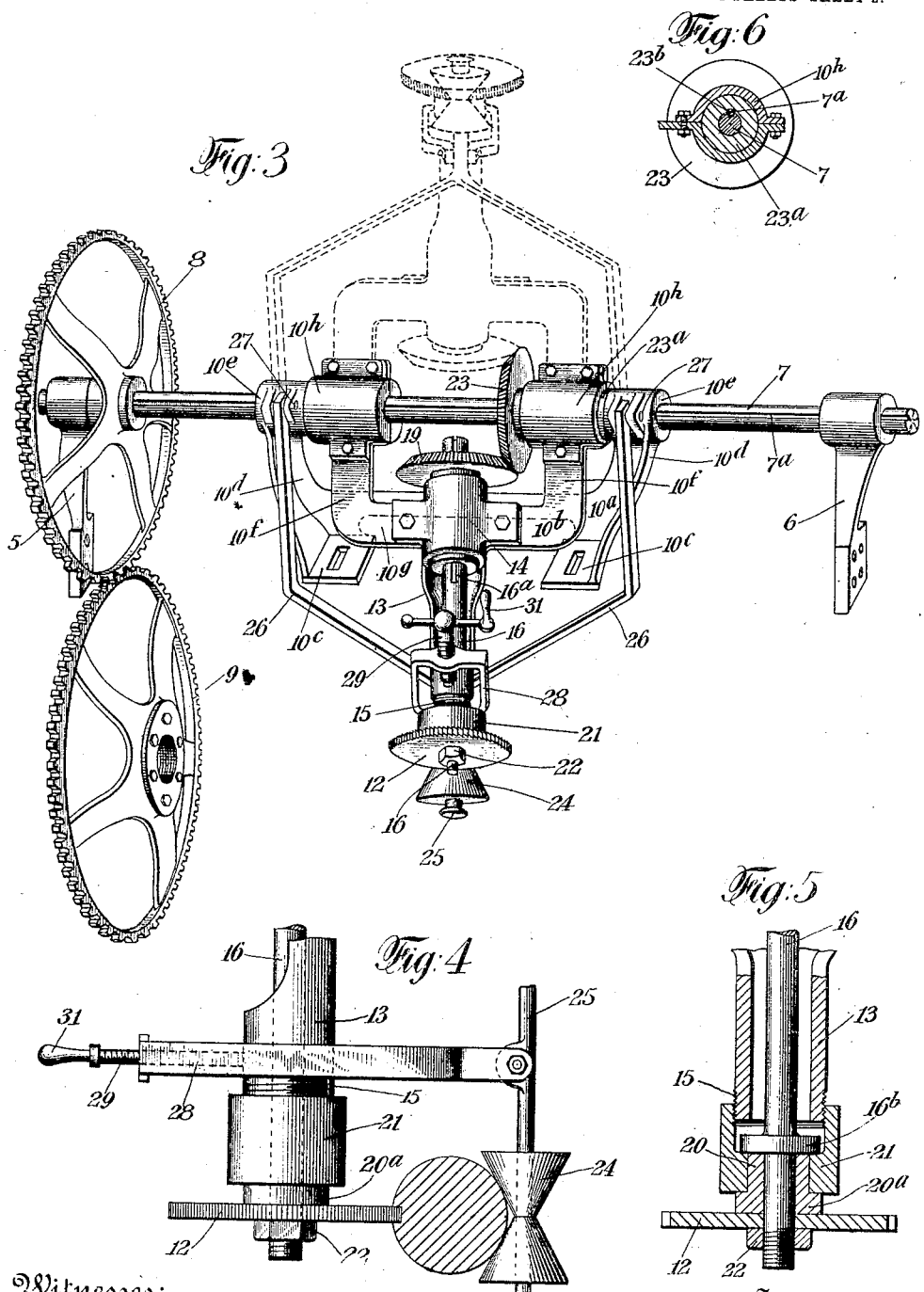

UNITED STATES PATENT OFFICE.

BEN S. WOOD, OF RUSSELL, KANSAS.

LATHE ATTACHMENT.

1,052,116. Specification of Letters Patent. Patented Feb. 4, 1913.

Application filed June 24, 1911. Serial No. 635,236.

*To all whom it may concern:*

Be it known that I, BEN S. WOOD, of Russell, county of Russell, and State of Kansas, have invented a new and useful Improvement in Lathe Attachments, of which the following is a specification.

My invention relates to mechanism adapted particularly for attachment to lathes, and designed to perform various kinds of irregular work ordinarily requiring special and complicated apparatus, such as the cutting of key seats in shafts, the cutting of teeth in ratchet and gear wheels, the formation of spiral grooves for twist drills, and other work of an analogous character.

My improved mechanism embodies a rotary spindle adapted to carry a cutting or milling tool, grinder, emery wheel, or other forming tool, according to the character of the work to be performed, which spindle is mounted in a frame supported by and movable along a rotary driving shaft applied to the lathe and driven by the mechanism thereof, suitable driving connections being provided between the driving shaft and spindle to impart to the latter rotary motion, and the mechanism being so disposed relative to the work supported by the lathe that the cutting or forming tool may be operatively engaged with the work.

In the accompanying drawings: Figure 1 is a top plan view of a lathe having my improved mechanism applied thereto. Fig. 2 is a transverse sectional elevation on the line $a$—$a$ of Fig. 1. Fig. 3 is a perspective view of the mechanism removed from the lathe. Fig. 4 is a side elevation of the forward end of the cutter spindle showing the means for clamping the cutter operatively to the work. Fig. 5 is a view in section on the line $a$—$a$, Fig. 1; and Fig. 6 is a view in section on the line $b$—$b$, Fig. 1.

Referring to the drawings: My improved mechanism is shown as applied to operate in connection with a lathe provided as usual with a traveling bed or slide 1 adapted to carry the customary tool rest and mounted on a suitable frame 2, and having the usual driving spindle 3 which may be provided with a chuck or face plate, or other means (not shown) for rotating the work held between the live center, $3^a$ at one end and the dead center 4 at the opposite end.

In applying my mechanism I journal in suitable arms 5 and 6 fixed to the frame of the lathe, a horizontal supporting and driving shaft 7 having fixed to it at the head end of the lathe, a pinion 8 driven by a gear 9 attached to the driving spindle 3 before alluded to. The gear 9 is formed to be detachably connected with the driving spindle so that the gear may be readily removed and replaced by the usual chuck or face plate of the lathe when the latter is to be used for its ordinary purposes. In order that there will be no interference with the chuck or face plate by the pinion 8 when the chuck or face plate is substituted for the gear 9, the latter is formed with a hub displaced axially or to one side of the general plane of the gear as shown in Fig. 3, which will cause the gear to be disposed in a plane to one side of the plane occupied by the face plate or chuck when the latter is substituted, and as the pinion 8 is in the same plane as the gear, the face plate or chuck when applied to the spindle will be disposed to one side of the pinion 8 and without liability of interference therewith.

The driving shaft 7 is formed with a key seat $7^a$ extending throughout its length, and has mounted on it so as to slide freely along the same, a frame 10 consisting of a fixed frame member $10^a$ and a relatively movable frame member $10^b$, the member $10^a$ being fixed to and movable with the sliding bed 1 of the lathe, while the member $10^b$ carries a cutter or shaping tool 12, presently to be described. The frame member $10^a$ is provided with a base plate or bracket $10^c$, seated on and bolted to the sliding bed 1, by means of bolts extending through transverse slots in the base plate and into the bed. At its ends the bracket is provided with laterally extending arms $10^d$, $10^d$, provided with hubs $10^e$, $10^e$, loosely encircling the shaft 7, so as to slide freely therealong as the base plate is correspondingly moved.

The relatively movable frame member $10^b$ is formed with lateral arms $10^f$, $10^f$, connected by a longitudinal portion $10^g$, the arms $10^f$, $10^f$, being provided at their ends with journal bearings $10^h$, $10^h$, loosely encircling the shaft and extending at the inner sides of the hubs $10^e$, $10^e$, the result being that the frame member $10^b$ will be carried along with the frame member $10^a$, while at the same time it may be swung or fulcrumed on the shaft as an axis, the purpose of which will presently appear.

Extending from the center of the longitudinal portion 10ᵍ of the frame member 10ᵇ, and in a direction transversely of the driving shaft 7, is a hollow arm 13 formed at its inner end with a journal bearing 14, and threaded exteriorly at its outer end as at 15. Extending axially and loosely through this arm and the journal bearing 14, is a rotary cutter spindle 16 having a key-way 16ᵃ extending some distance from its inner end. In this key-way extends a key or spline 17 projecting inwardly from the bore of a hub 18 on a bevel gear 19, which hub is seated loosely in the journal bearing 14 so as to revolve freely therein, with its bore surrounding the spindle. By means of this construction, the bevel gear 19 is drivingly interlocked or splined to the spindle, while the latter is capable of an endwise movement with reference to the gear. Near its outer end the spindle has a bearing in a collar 20 provided at its outer end with an annular flange 20ᵃ and seated at its inner end against an annular shoulder 16ᵇ on the spindle 16. The collar 20 is encircled by a sleeve 21 seated between the annular shoulder 16ᵇ and the annular flange 20ᵃ, which sleeve is cored out at its inner end and formed with internal screw threads engaging the exteriorly threaded end of the arm 13.

The function of the sleeve 21 is to adjust the spindle endwise in the arm 13 so as to vary the relation of the cutting or forming tool 12 to the work operated on, this adjustment being effected through the medium of the collar 20, against the flange of which the cutter wheel 12 is firmly clamped by means of a nut 22 screwed on the outer end of the spindle. When the sleeve 21 is screwed inwardly on the arm 13, the sleeve will engage the annular shoulder 16ᵇ on the spindle and will slide the latter endwise inwardly through the bevel gear, the spline of the hub of the gear and the key-way in the spindle, permitting of this sliding movement while preserving the driving connection between the gear and spindle. When the sleeve 21 is screwed outwardly on the arm, the sleeve will engage the annular flange 20ᵃ and will slide the spindle outwardly in the opposite direction from its first adjustment. By the provision of the flange 20ᵃ on the collar 20, and the engagement of the inner end of the collar with the shoulder 16ᵇ on the spindle, the cutter wheel may be clamped firmly and tightly in place on the spindle without binding the adjusting sleeve 21, which latter is at all times free to be turned to effect the endwise adjustment of the spindle.

Rotary motion is imparted to the bevel gear 19 by means of a driving bevel gear 23 meshing therewith and provided with a hub 23ᵃ mounted to rotate in one of the journal bearings of the frame member 10ᵇ. The bore of this bevel gear is provided with an inwardly extending spline 23ᵇ extending loosely into the key-way in the shaft 7, so that while the bevel gear 23 will be rotated by the shaft, it will be permitted to move along longitudinally thereof as the frame 10 is correspondingly moved.

From the foregoing description it will be understood that the cutting wheel or shaping tool is carried in a frame, which, while being movable longitudinally along and supported by the driving shaft from which the cutter spindle receives its rotary motion, may nevertheless be swung on said shaft as an axis, so that the tool may be adjusted or moved to an operative or inoperative position with reference to the work, the inoperative position of the frame being shown by dotted lines in Fig. 3, where it will be seen that the frame is thrown back so that it will not interfere with the operation of the lathe for ordinary lathe work.

It will be understood that different forms of cutting wheels or tools may be applied to the spindle, according to the nature of the work to be performed. If it is desired, for instance, to cut slots in a shaft, the latter will be set in the machine between a center pin on the driving gear 9 and the usual center pin carried by the dead spindle. By suitable means the shaft will be held from rotation, and motion being imparted to the gear 9, it will be transmitted to the cutter through the medium of the pinion 8, shaft 7, and intermeshing bevel gears 23 and 19. The cutter being then brought down on the work, will cut a slot therein. If it is desired that this slot be continued longitudinally so as to constitute a key-way in the shaft, then the mechanism of the lathe by which the sliding bed is advanced is set in motion, and as the bed travels, the frame in which the cutter is mounted will be moved along with the bed, and as the cutter rotates it will form a longitudinal slot or key-way in the shaft. If it is desired to cut a spiral groove in the shaft, the foregoing operations are repeated, and in addition the shaft is slowly rotated on the centers.

By the adjusting sleeve 21 the cutter spindle may be moved inwardly or outwardly, so as to vary the relation of the cutter to the work, and the latter in this way be caused to cut at different points. In order that the cutter may be held to the work operatively and fed so as to cut deeper therein, I provide an abutment 24 adapted to engage the side of the work opposite the cutter, and in connection with this abutment I provide suitable means for moving the same relatively to the cutter so as to clamp the work between the two, the movement being such that the clamping action may be increased as the action of the cutter progresses, and in this way gradually deepen the slot formed by the cutter. In its preferred construction the abutment is in the form of a roller with a concave face to bear on the work, which roller is mounted on the outer end of an arm 25 provided with oppositely extending branch arms 26—26 pivoted at their inner ends as at 27—27 to the hubs 10$^b$, 10$^b$, on an axis extending parallel with the axis of the driving shaft 7, the arrangement being such that the roller carried by the pivoted arms may be swung to and from the cutter spindle.

Pivoted to the arm 25 is a stirrup frame 28 straddling the outer end of the arm 13 in which the cutter spindle is mounted, through which stirrup is threaded an adjusting clamping screw 29, adapted at its inner end to bear against the arm 13 and provided at its outer end with a handle 31 for turning it. By screwing the screw inwardly, the abutment roller will be drawn up against the lower side of the work and will force the cutter downwardly on the opposite side of the work, by which means the cutter is clamped operatively to the work.

In the foregoing description and in the accompanying drawings I have disclosed my invention in the form which I prefer to adopt and which in actual practice has been found to answer to a satisfactory degree the ends to be attained; but it will be understood that the mechanism shown may be variously modified and changed without departing from the limits of my invention, provided the operation is substantially as indicated above; and it will be understood that the invention is not limited to any particular form or construction of the parts except in so far as such limitations are specified in the claims.

Having thus described my invention, what I claim is:—

1. In a machine of the type described, the combination of means for supporting the work, a rotary shaft extending parallel to the work and occupying a definite relation thereto, a cutting tool pivotally mounted upon said shaft so as to be swung about the same as an axis to an inoperative position, a tool rest carrying slide movable in fixed guides upon the machine frame and adapted to move the cutting tool along the shaft with it, and operative connections between the shaft and tool for driving the latter, the said connections being such as to permit the aforesaid movements.

2. In a machine of the type described, the combination of means for holding the work, a rotary shaft extending parallel to and in rear of the work and occupying a definite relation thereto, a frame pivotally supported upon said shaft so as to swing rearwardly around the same as an axis and extending transversely in a forward direction therefrom, a rotary tool mounted in the frame and adapted to act on the work, a tool rest carrying slide movable in fixed guides upon the machine frame and adapted to slide the tool frame along the shaft with it, and operative connections between the shaft and rotary tool, said connections being such as to permit the aforesaid movements.

3. In a lathe attachment, the combination of means for supporting the work, a movable slide adapted to support the tool rest in front of the work, a forwardly extending frame connected with the slide in rear of the work and movable with the slide longitudinally of the work and also movable bodily at will upwardly and rearwardly relatively to the slide away from the work, a cutting tool carried by the frame and adapted to act on the work, and means for rotating the cutting tool.

4. The combination of means for holding the work, a cutter to act on the same, a traveling supporting frame for the cutter, and means additional to and traveling with the supporting frame for clamping the cutter operatively to the work.

5. The combination of means for holding the work, a cutter to act on the work, a traveling supporting frame for the cutter, and additional means carried by the supporting frame for clamping the cutter slidingly to the work.

6. The combination of means for supporting the work, a frame, a cutter spindle mounted in said frame and adjustable endwise therein, a driving gear supported by the frame and held against endwise movement thereon and having driving engagement with the spindle, and means for adjusting said spindle endwise relative to the driving gear; whereby the relation of the cutter to the work may be varied.

7. The combination of means for supporting the work, a frame, an abutment carried by the frame and adapted to engage the work on one side, a cutter carried by said frame and adapted to act on the opposite side of the work, and means for moving the abutment relative to the cutter to clamp the work between them.

8. In combination with means for supporting the work, a frame, an abutment pivotally connected with the frame and adapted to engage the work, a cutter carried by said frame and adapted to act on the work, and means for forcing the abutment and cutter toward each other against the work between them.

9. In combination with means for supporting the work, a frame, an abutment connected with the frame and adapted to engage the work on one side, a yoke connected with the abutment and engaging with the frame, and a cutter carried by the frame and adapted to act on the work on the opposite side.

10. In a mechanism of the type described, the combination of means for supporting the work, a rotary shaft, a frame slidable on said shaft and provided with a transversely extending arm, a cutter spindle mounted in the arm and movable endwise therein, driving connections between the shaft and spindle, and a sleeve adjustable longitudinally of the arm and engaging the spindle.

11. In a lathe and in combination with a driving spindle and means for supporting the work, a rotary shaft extending parallel with the driving spindle, a driving gear on said shaft, a cutter spindle supported by the shaft and operated thereby, and a removable gear mounted on the driving spindle and engaging the first named gear, said removable gear having its hub offset axially with relation to the plane of the gear.

In testimony whereof I hereunto set my hand this 20th day of June, 1911, in the presence of two attesting witnesses.

BEN S. WOOD.

Witnesses:
LOUIS BANKER,
C. A. STRECKER.